Figure 1:
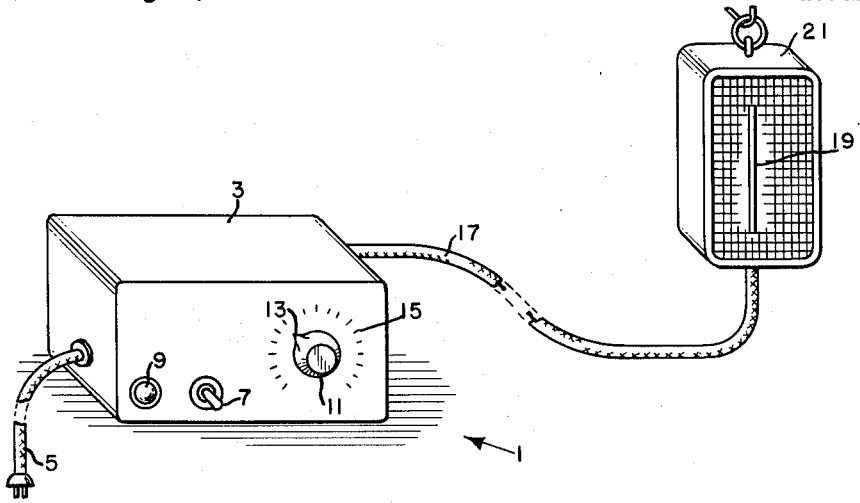

Jan. 18, 1966  P. B. FREDRICKSON  3,230,423
EMITTER

Filed Aug. 2, 1962  2 Sheets-Sheet 1

INVENTOR.
PAUL B. FREDRICKSON
BY
*Walter F. Wessendorf*
*Attorney*

Jan. 18, 1966  P. B. FREDRICKSON  3,230,423
EMITTER
Filed Aug. 2, 1962  2 Sheets-Sheet 2

INVENTOR.
PAUL B. FREDRICKSON
BY
Walter J. Wesendorf Jr.
Attorney

# United States Patent Office 3,230,423
Patented Jan. 18, 1966

3,230,423
EMITTER
Paul B. Fredrickson, Troy, N.Y., assignor, by direct and mesne assignments, of fifty percent to Paul B. Fredrickson, Sudbury, Mass., forty percent to Walter F. Wessendorf, Jr., Guilderland, N.Y., ten percent to Nelson H. Shapiro, Washington, D.C.
Filed Aug. 2, 1962, Ser. No. 214,281
6 Claims. (Cl. 317—4)

This invention relates to a device to emit negative ions into a room or home.

Accordingly it is the object of this invention to provide a device to safely emit negative ions into a room or home without any ozone generation.

Another object of the invention is to provide a transformer for use with the invention, but which has utility separate and apart from the invention.

Figure 3:
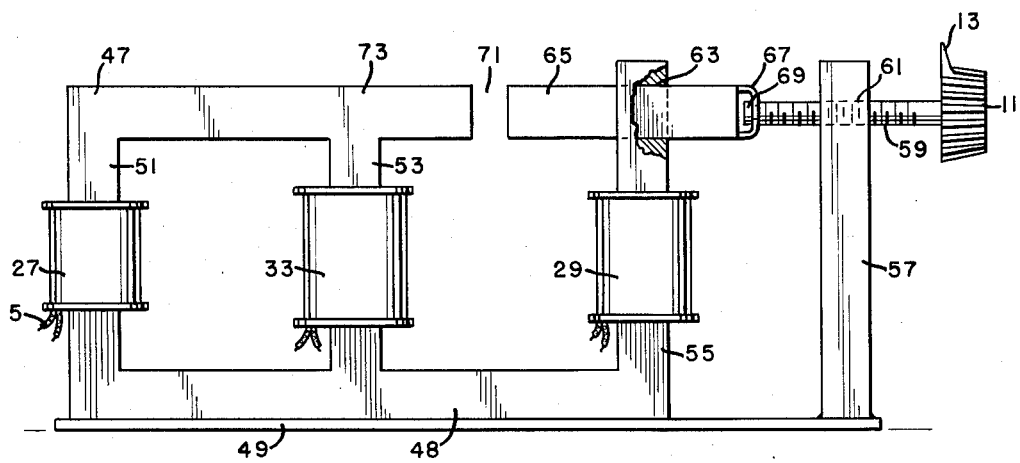
Figure 2:
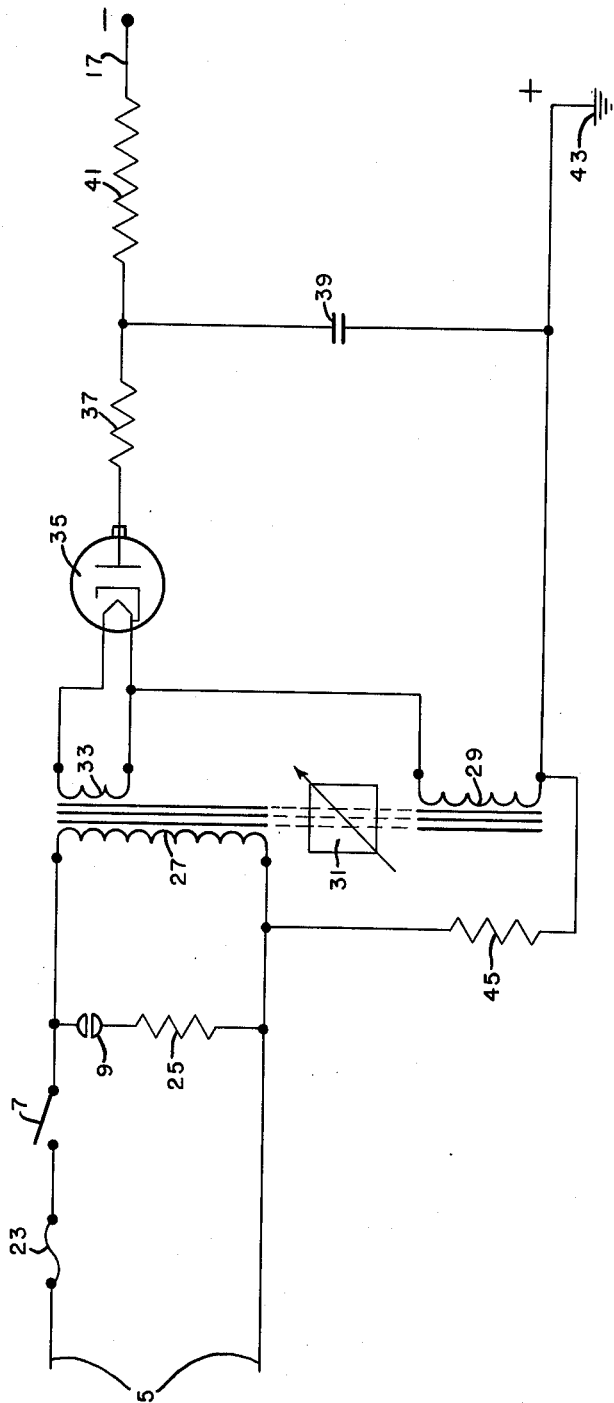

These and other objects of the invention should be appreciated from the detailed specification taken in conjunction with the drawings in which like reference numerals refer to similar parts, in which:

FIG. 1 is a perspective view of the invention;
FIG. 2 is the circuit wiring diagram for the invention;
FIG. 3 is a side view of the transformer; partly shown in section.

In FIG. 1 reference numeral 1 generally refers to the invention comprising a chassis 3, conductors 5 for connection to a 110-volt A.C. source, switch 7, pilot light 9, knob 11 with its pointer 13, appropriate indicia 15 on the front of chassis 3, emitter cable 17 leading from the chassis 3 to the emitter wire 19 housed in a housing grid 21 of suitable non-conductor material.

FIG. 2 shows fuse 23 and switch 7 series connected to the 110-volt A.C. source by the conductors 5 across which are connected pilot light 9 and 100K ohms-1 watt resistor 25. Connected across the A.C. source is the primary coil 27 of a transformer. A secondary coil 29 (referred to as the second secondary coil) steps up the voltage to a 7000 volt maximum. The voltage induced in the second secondary coil is varied mechanically by adjustment of the flux coupling the primary coil and the second secondary coil, as indicated at 31. Secondary coil 33 (referred to as the first secondary coil) steps the voltage down to 2.5 volts to provide filament power to a high voltage rectifier tube type 2X2A, 35. The cathode of the high voltage rectifier is connected in series with coil 29 and passes the negative high voltage pulses. This pulsating current is smoothed out by flowing through a series connected 100K ohms-1 watt resistor 37 and across a 0.001 microfarads 20 K volts capacitor 39. The smoothed out D.C. current then flows through a series connected 5 megohm resistor 41, which functions as a current limiting resistor and provides a safety factor in event of physical touching of the emitter wire 19. Negative ion output provided for emission from the emitter wire 19 is controlled by adjustment of the flux through the high voltage coil 29. The positive side of the power supply is grounded to the chassis as indicated at 43 and is also grounded to the A.C. power supply 5 through a 1 megohm-1 watt resistor 45 which functions to permit leakage of the built up positive charge on the positive side of the circuit to A.C. input supply.

FIG. 3 shows an iron loop 47 secured by its bottom portion 48 to non-conductor support structure 49. The iron loop 47 is of square cross-sectional configuration. Primary coil windings 27 from the power supply 5 are wound on the one end portion 51 of loop 47. First secondary coil windings 33 are wound around the middle portion 53 of loop 47. Second secondary coil windings 29 are wound around the other end portion 55 of loop 47. An upstanding member 57 is secured to the support structure 49. A screw 59, at one end of which is secured knob 11, engages threaded hole 61 in the upper portion of member 57. Complementally configured cut out portion 63 formed in the upper portion of end 55 receives iron sliding bar 65 cross-sectionally of square shaped configuration. It should be appreciated that end portion 55 is greater dimensionally than bar 65 in order that end portion 55 will structurally receive bar 65. A retainer member 67 secured to bar 65 has a hole (not shown) formed therein. A locking screw 69 having its head of greater diameter than the hole formed in retainer member 67 is inserted through the retainer hole and fixedly engages a tapped hole (not shown) in the end of screw 59 in such a manner that screw 59 is freely rotatable relative to bar 65. However, as arranged and constructed, rotation of screw 59 in threaded hole 61 will effect reciprocation of sliding bar 65 in cut out portion 63.

In operation primary coil 27 induces current flow in first secondary coil 33 and in second secondary coil 29. The current flow induced in coils 29 and 33 will be relatively independent of each other. The current flow induced in coil 33 by coil 27 will be relatively constant. The current flow induced in coil 29 by coil 27 may be varied by rotation of screw 59 to vary the air gap between the end of the upper portion 73 of iron loop 47 and the end of sliding bar 65.

The transformer shown in FIG. 3 and hereinbefore described may be classified as a variable reluctance type transformer. It is especially useful wherever a source of variable and fixed A.C. voltages are required. One application is a power supply of the type commonly found in electronic power pack supplies. Certain fixed small A.C. voltages are required to operate the filaments of vacuum tubes. Variable voltages are often required for the B supply or plate current supply for adjustment purposes to obtain the optimum performance for the particular circuit or for experimental purposes. In addition certain voltages, variable and fixed, are required having opposite polarity, such as the C voltages or bias voltages found in amplifiers and other electronic apparatus. These voltages are normally obtained by rectifying and filtering the voltage obtained from fixed coils within the transformer. Presently, a variation is obtained by means of a resistive element or electronic voltage regulators. These methods have the inherent disadvantage of being subjected to tube and/or component failure thereby necessitating repair work.

It is within the concept of the invention relating to the transformer to have a single transformer unit having multiple secondary coils. The voltage output from certain coils could be held constant and the voltage output from other coils could be varied at will.

In operation of the emitter the housing grid 21 should be placed as far away from the chassis 3 as possible to prevent grounding out of the negative ions emitted.

Practical tests have demonstrated that, with the emitter operating, smoke and odors will not be perceptible to the senses after a period of twenty to twenty-five minutes. One test was the daubing of a quarter can of black shoe polish on a rag and setting fire to this rag in a metal wastebasket. Another test was the cooking of five pounds of shrimp in the closed confines of two average size rooms. Another test was the broiling of several steaks in a wall oven with the oven door left partially open. In each one of these tests no means for ventilation of the rooms or exhaustion of the air from the rooms was provided.

Having thusly described my invention, I claim:
1. A negative ion emitting device comprising a chassis, a transformer supported on said chassis and having a primary winding and a high-voltage secondary winding, line conductor means for connecting said primary winding to an A.C. source, said transformer having mechanically operated variable reluctance means for varying the A.C. voltage across said secondary winding, high-voltage rectifier means supported on said chassis for producing a high-voltage D.C. output from the A.C. voltage across said secondary winding, a non-conductive housing separated from said chassis, and an output conductor extending from the output of said rectifier means to said housing and terminating in a length of wire supported upon said housing for producing negative ions.

2. The device of claim 1, said line conductor means being connected to said secondary winding by a resistor having a resistance of the order of 1 megohm.

3. The device of claim 2, one end of said secondary winding being connected to said resistor and to said chassis.

4. The device of claim 1, the output of said rectifier means being connected to said wire through a resistor having a resistance of the order of several megohms.

5. A negative ion emitting device comprising a chassis, a transformer supported on said chassis and having a primary winding, a high-voltage secondary winding, a low-voltage secondary winding, and a magnetic core supporting said windings, said core having a closed loop of magnetic material coupling said primary and low-voltage secondary windings and having a loop of magnetic material with an adjustable gap coupling said primary and high-voltage secondary windings, line conductor means for connecting said primary winding to an A.C. source, a resistor connecting one end of said primary winding to one end of said high-voltage secondary winding and to said chassis, a high-voltage rectifier tube having a heater connected across said low-voltage secondary winding, a cathode connected to the other end of said high-voltage secondary winding, and an anode, an output conductor, a pair of resistors connected in series between said anode and said output conductor, and a capacitor connected between the junction of said pair of resistors and said chassis, said output conductor terminating in an emitter wire.

6. In combination, a transformer comprising a magnetic core, a primary winding, a high-voltage secondary winding, and a low-voltage secondary winding, and an electron tube having a heater connected across said low-voltage secondary winding and a cathode and an anode connected in series with said high-voltage secondary winding, said core having a closed loop of magnetic material coupling said primary and low-voltage secondary windings and having a loop of magnetic material with an adjustable gap coupling said primary and high-voltage secondary windings.

References Cited by the Examiner
UNITED STATES PATENTS

| | | | |
|---|---|---|---|
| 2,029,628 | 2/1936 | Lord | 323—51 |
| 2,043,217 | 6/1936 | Yaglow | 317—4 |
| 2,449,649 | 9/1948 | Forney | 336—134 |
| 2,617,860 | 11/1952 | Kudelski | 317—4 |
| 2,620,457 | 12/1952 | Crooker | 307—93 |
| 2,738,458 | 3/1956 | Walsh | 323—51 |
| 2,894,196 | 7/1959 | Bernbaum | 321—2 |

SAMUEL BERNSTEIN, *Primary Examiner.*